United States Patent [19]

Robinson et al.

[11] Patent Number: 4,883,615
[45] Date of Patent: Nov. 28, 1989

[54] FLAMEPROOFING COMPOUNDS

[75] Inventors: Tibor Robinson, Basel; Rainer Wolf, Allschwil, both of Switzerland

[73] Assignee: Sandoz Ltd., Basel, Switzerland

[21] Appl. No.: 884,853

[22] Filed: Jul. 14, 1986

[30] Foreign Application Priority Data

Jul. 18, 1985 [DE] Fed. Rep. of Germany ....... 3525659
Jul. 18, 1985 [DE] Fed. Rep. of Germany ....... 3525660

[51] Int. Cl.$^4$ .............................................. C07F 9/00
[52] U.S. Cl. .................................. 428/423.1; 558/86; 558/207
[58] Field of Search ....................... 260/501.12, 301.12

[56] References Cited

U.S. PATENT DOCUMENTS

| | | | |
|---|---|---|---|
| 2,622,075 | 12/1952 | Hemmi et al. | 8/551 |
| 2,649,354 | 8/1953 | Hemmi et al. | 8/551 |
| 4,410,652 | 10/1983 | Robinson et al. | 524/185 |
| 4,439,203 | 3/1984 | Runyon et al. | 8/496 |
| 4,443,223 | 4/1984 | Kissling et al. | 8/496 |
| 4,559,058 | 12/1985 | Bennett et al. | 8/496 |

FOREIGN PATENT DOCUMENTS 2163760 3/1986 United Kingdom .

*Primary Examiner*—Anton H. Sutto
*Attorney, Agent, or Firm*—Gerald D. Sharkin; Richard E. Vila; Joanne M. Giesser

[57] ABSTRACT

A process for flameproofing a substrate comprising applying to the substrate a compound of formula I

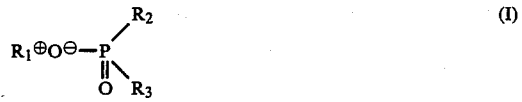

in which $R_1^\oplus$ is a $N^\oplus$ cation defined in the Specification and $R_2$ and $R_3$ are organic radicals.

Substrates to which the compound of formula I can be applied include cellulosic substrates.

9 Claims, No Drawings

FLAMEPROOFING COMPOUNDS

The invention relates to novel phosphates that are useful for flameproofing polymeric material.

According to the invention, there is provided a process for flameproofing a substrate comprising applying to the substrate a compound of formula I

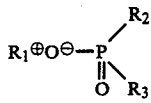  (I)

in which $R_1^\oplus$ is an $N^\oplus$ cation derived from protonation of (A) the water-soluble reaction product of an alkylene diamine or polyalkylene polyamine with cyanamide, dicyanodiamide, guanidine or bisguanidine or with a mixture of at least 50 mole % of cyanamide, dicyanodiamide, guanidine or biguanidine and up to 50 mole % of a dicarboxylic acid or a mono- or di-ester of a dicarboxylic acid, optionally in the presence of a catalyst selected from metals, metal salts and heterocyclic nitrogen-containing organic bases; said Product A containing reactive hydrogen atoms bound to nitrogen;

(B) the water-soluble reaction product of Product A with epichlorohydrin or a precursor thereof, (C) the water-soluble reaction product of Product A with formaldehyde or a formaldehyde precursor, or (D) the water-soluble reaction product of Product A, B or C with a N-methylol derivative of a urea, melamine, guanamine, triazinone, urone, carbamate or acid amide optionally in the presence of a catalyst for the crosslinking of N-methylol compounds listed above;

$R_2$ is —OH; —OC$_{1-12}$alkyl; —O—phenyl; —O$^\ominus$NH$_4^\oplus$; or $R_1^\oplus$ where $R_1^\oplus$ is as defined above;

$R_3$ is C$_{1-12}$alkyl or phenyl or has a significance of $R_2$ independently of $R_2$; or $R_2$ and $R_3$ form a group of the formula (a)

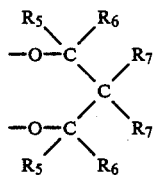  (a)

where each $R_5$ independently is hydrogen or C$_{1-4}$alkyl;

each $R_6$ independently is hydrogen or methyl; and each $R_7$ independently is hydrogen, C$_{1-4}$alkyl, —CH$_2$Br or —CH$_2$Cl.

Further according to the invention there is provided a compound of formula I defined above, with the proviso that when $R_1^\oplus$ is derived from Product A alone where Product A is the reaction product of diethylenetriamine and cyanamide or dicyanodiamine and $R_2$ is —OH then $R_3$ is not —OH.

For the avoidance of doubt, where any symbol appears more than once in a formula its significances are independent of one another. Any substituent capable of being linear or branched is linear or branched unless indicated to the contrary. Unless indicated to the contrary any percentages hereinafter given are by weight.

In this Specification, for the avoidance of doubt, in formula I the group $R_1^\oplus$ may have more than one cationic centre, and therefore in this case more than one phosphate group may be associated with $R_1$. The ratio of $R_1^\oplus$ to phosphate groups is however preferably such that the pH of the product in aqueous medium is in the range from 7 to 9 inclusive.

The reaction products (A) and (D) where D is not derived from B or C are described in U.S. Pat. Nos. 4,410,652 and 4,443,223 and British Patent Application Publication No. 2,163,760A, the alkylene diamines and polyalkylene polyamines being referred to therein as "polyfunctional primary or secondary amines".

The reaction products (B) and (C) (B) or (C) are described in U.S. Pat. Nos. 4,439,203 and 4,559,058, the alkylene diamines and polyalkylene polyamines being referred to therein as "polyfunctional primary or secondary amines".

The optional catalyst in Product A is defined as catalyst K in British Patent Application Publication No. 2,163,760A.

The contents and preferences of U.S. Pat. Nos. 4,410,652; 4,443,223; 4,439,203 and 4,559,058 and British Patent Application Publication No. 2,163,760A are incorporated herein by reference.

The water-soluble reaction products A to D defined above are predominantly linear polymers which are soluble or dispersible in water and do not gel. They contain primary and/or secondary and/or tertiary amino groups, in any case —NH— and/or —NH$_2$ groups. These reaction products have a basic character, and when mixed with water have a pH value of 10 to 12, preferably 10.5 to 11. In these reaction products A to D the alkylene diamine is preferably a C$_{2-6}$alkylene and the polyalkylene polyamine is preferably of the formula (b)

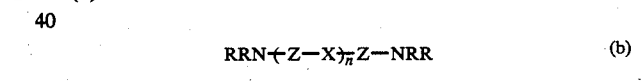  (b)

in which each

R independently is hydrogen or a C$_{1-10}$alkyl group, unsubstituted or mono-substituted with hydroxy, C$_{1-4}$alkoxy or cyano;

n is a number from 0 to 100 inclusive;

Z, or each Z independently, when n<0, is C$_{2-4}$alkylene or hydroxy C$_{2-4}$alkylene; and X or each X independently, when n <1, is —O—, —S— or —NR— when R is as defined above, provided that the amine of formula (b) contains at least one reactive —NH— or —NH$_2$ group.

Preferred amines of formula (b) are those in which each

R is hydrogen;

n is a number from 0 to 4 inclusive;

X is —NH— or —N(CH$_3$)—; and each

Z independently is a C$_{2-4}$alkylene group. More preferred amines of formula (b) are diethylene triamine, triethylene tetraamine, tetraethylene pentamine, 3-(2'-aminoethyl)-aminopropylamine, dipropylene triamine or N,N-bis-(3-aminopropyl)methylamine.

Preferably the catalyst optionally used in Product D contains a metal, preferably is a metal salt, especially the salt of a metal from Group II or III of the Periodic Table, more preferably from group II of the Periodic Table. Zinc chloride and magnesium chloride are most preferred catalysts.

Preferably Product A (defined above) is Product A' where Product A' is the water-soluble reaction product of diethylenetriamine, triethylenetetraamine or tetraethylenepentamine with cyanamide or dicyanodiamide (more preferably dicyanodiamide).

Preferably Product B (defined above) is Product B' where Product B' is the water-soluble reaction product of Product A' (defined above) with epichlorohydrin.

Preferably Product C (defined above) is product C' where Product C' is the water-soluble reaction product of Product A' with formaldehyde.

Preferably Product D (defined above) is Product D' where Product D' is the water-soluble reaction product of Product A', B' or C' with dimethyloldihydroxyethylene urea, optionally (though preferably) in the presence of a catalyst selected from magnesium chloride or zinc chloride.

Preferably $R_1^\oplus$ is $R_{1a}^\oplus$ where $R_{1a}^\oplus$ is the $N^\oplus$ cation derived from Product A', Product B', Product C' or Product D', more preferably $R_{1a}^\oplus$ is the $N^\oplus$ cation derived from Product A'.

Preferably $R_2$ is $R_2'$ where $R_2'$ is —OH or a significance of $R_{1a}^\oplus O^\ominus$ defined above.

Preferably $R_3$ is OH.

Still, further according to the invention, there is provided a method for preparing a compound of formula I (including the proviso) comprising reacting a compound of formula II

in which the symbols are as defined above with a compound (A), (B), (C) or (D), until the pH of the mixture reaches a value in the range of 7 to 9 inclusive.

Preferred compounds of formula II that they may be used are selected from orthophosphoric acid, mono- or di-ethylphosphoric acid ester, mono- or di-butyl phosphoric acid ester, di-ammonium hydrogen phosphate, ammonium dihydrogen phosphate, phenylphosphonic acid or the compound of formula (c)

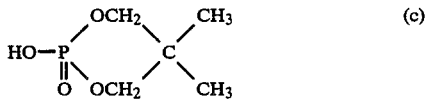

The reaction of an acid of formula II with the solution or dispersion of reaction Product A, B, C or D may take place preferably at temperatures of between 0° and 100° C. inclusive, more preferably at temperatures of 20° to 80° C. inclusive. In this reaction, sufficient basic product A, B, C or D is added to the acid (compound of formula II) for a pH of 7 to 9, preferably 7.2 to 8.5, to be produced in the solution. The quantity required for this depends on the basicity of the product A, B, C or D.

The compounds of formula I obtained may be used for the flameproof finishing of diverse substrates in the form of the aqueous solutions or dispersions, or they may be processed into powders by drying (in spray-drier or on a fluidised bed granulator).

The aqueous solutions may be used to treat hydrophilic substrates and substrates having a large (porous) surface area, e.g. paper, non-woven fabrics, knit and woven fabrics consisting of neutral or regenerated cellulose, semi- or fully-synthetic fibre materials by padding or impregnation or immersing the substrate in the solution. It is also possible to use the compounds of formula I in polymer dispersions and suspensions, e.g. those of polymethacrylates.

However, the compounds of formula I can also be added to the polymers in the form of powders, before, during or after polymer formation, and they can thus be incorporated into the polymer mass.

Suitable polymeric organic materials for flameproof finishing are for example cellulosic materials, polyurethanes, polyacrylic esters, polyolefins especially polyethylene, polypropylene and their copolymers; polyesters especially polyethylene terephthalate and polybutylene terephthalate; unsaturated polyester resins, polyamides especially nylon; polystyrenes, ABS polymers, polyacrylonitrile and its copolymers, epoxy resins and PVC. Preferred are the cellulosic materials.

The invention also relates to compositions, for the flameproofing of polymers comprising one or more compounds of formula I and a polymeric material. Such compositions are usually master batches or are in the form of a suspension or solution.

The quantity of compound of formula I which is required for satisfactory flameproofing of the polymer varies within a wide range, and is dependent on the polymer. It is customary to add between 0.5 and 40, preferably between 2 and 30, most preferably between 5 and 25 percent by weight of compound of formula I based on the weight of substrate to which it is applied.

In this Specification all ranges given include the numbers defining the ranges.

The invention will now be illustrated by the following Examples in which all parts and percentages are by weight and all temperatures are °C.

EXAMPLE 1

309 Parts of diethylenetriamine and 1.68 parts of $ZnCl_2$ are mixed and stirred well together, 252 parts of dicyanodiamide are added over 30 minutes whilst stirring; and the temperature is allowed to rise to 30°. A suspension results. The mixture is heated to 100° over 50 minutes and a clear solution results. The mixture is heated to 160° over 85 minutes, whereby at 110° the formation of ammonia starts. The evolution of ammonia is at its greatest at 130°. The gas, that is formed, is absorbed in 500 ml of water and is continuously neutralised with 35% hydrochloric acid. From the amount of HCl used, the amount of ammonia generated can be calculated. When the formation of ammonia begins the reaction mass becomes cloudy and then is transformed into watery melt, that with time becomes more viscous.

The mixture is then stirred at 160° for 2 hours, and during the final hour the formation of ammonia tails off. The melt is then allowed to solidify and is then pulverised.

EXAMPLES 2 TO 4

Following the procedure of Example 1, but using instead of 309 parts of diethylenetriamine an equimolar amount of triethylenetetraamine (Example 2), tetraethylene pentamine (Example 3) or ethylenediamine (Example 4), similar reaction products to that of Example 1 can be prepared.

EXAMPLE 5

100 Parts of the reaction product of Example 1 are added to 250 parts of water at 20° to 30° whilst stirring and are neutralised to pH 7.5 with 52 parts of 80% orthophosphoric acid whereby the temperature is not allowed to rise over 30°. The resulting suspension is stirred for 2 hours at 80°.

A solution of the phosphate salt of the reaction product is obtained having about 40% actives. The solution can be concentrated, dried in a vacuum drier at 60° to 140° and ground into a powder.

EXAMPLES 6 TO 8

Following the procedure of Example 5 but using an equivalent molar amount of the reaction products of Examples 2, 3 or 4 respectively, the phosphate salt of the appropriate reaction products results.

APPLICATION EXAMPLE A

70 Parts of polypropylene (Profax 6501 powder) are melted in a rolling mill at 165° to 175°. 30 Parts of the phosphate salt of Example 5 are added to the melt and the mixture is homogenised over 3 minutes. The resulting rolled mass is pressed in a press at 230° for 3 minutes to form 3 mm thick plates. The resulting plates show a low inflammability.

APPLICATION EXAMPLE B

The phosphate salt of Example 5 is diluted with sufficient water to give 35% actives.

Unsized sheets of paper from cellulose that has only been ground a little are immersed in the solution containing the phosphate. The sheets are then laid on a glass plate and then squeezed twice with a glass rod. Then the paper is pressed under 10 Torr pressure and dried for 25 minutes at 100°. The resulting paper has about 40% phosphate actives (% calculated on the dry weight of paper).

These sheets show excellent flameproofing.

APPLICATION EXAMPLE C

A 25% and a 30% actives solution of the phosphate salt of Example 5 were prepared and used to impregnate paper. The dried paper samples contain 18.7% and 26.2% actives (i.e. phosphate salt). The samples show good flameproofing properties.

These papers show a slight yellowing effect that can be compensated for by using optical brighteners without losing the flameproofing effect.

APPLICATION EXAMPLE D

Polyurethane foam in the form of a thick sheet is padded with a 40% actives solution of the phosphate salt of Example 5. The foam is squeezed to give a 200% increase over the original dry weight of the foam used and then the foam is dried. The resulting foam contains an 80% impregnation and has very good flammability properties (i.e. low inflammability).

In Application Examples A to D, instead of the phosphate salt of Example 5, an appropriate amount of the phosphate salt of any one of Examples 6 to 8 may be used instead.

What is claimed is:

1. A process for flameproofing a substrate comprising applying to the substrate a compound of formula I

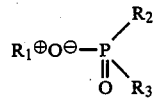

in which $R_1^\oplus$ is an $N^\oplus$ cation derived from protonation of (A) the water-soluble reaction product of an alkylene diamine or polyalkylene polyamine with cyanamide, dicyanodiamide, guanidine or bisguanidine or with a mixture of at least 50 mole % of cyanamide, dicyanodiamide, guanidine or biguanidine and up to 50 mole % of a dicarboxylic acid or a mono- or di-ester of a dicarboxylic acid, optionally in the presence of a catalyst selected from metals, metal salts and heterocyclic nitrogen-containing organic bases; said Product A containing reactive hydrogen atoms bound to nitrogen; or (B) the water-soluble reaction product of Product A with epichlorohydrin or a precursor thereof, (C) the water-soluble reaction product of Product A with formaldehyde or a formaldehyde precursor, or (D) the water-soluble reaction product of Product A, B or C with a N-methylol derivative of a urea, melamine, guanamine, triazinone, urone, carbamate or acid amide optionally in the presence of a catalyst for the crosslinking of N-methylol compounds listed above;

$R_2$ is $-OH$; $-OC_{1-12}alkyl$; $-O-phenyl$; $-O^\ominus NH_4^\oplus$; or $-O-R_1^\ominus$ where $R_1^\ominus$ is as defined above;

$R_3$ is $C_{1-12}alkyl$ or phenyl or has a significance of $R_2$ independently of $R_2$; or $R_2$ and $R_3$ form a group of the formula (a)

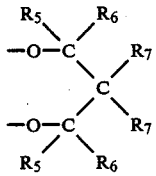

where
each $R_5$ independently is hydrogen or $C_{1-4}alkyl$;
each $R_6$ independently is hydrogen or methyl; and
each $R_7$ independently is hydrogen, $C_{1-4}alkyl$, $-CH_2Br$ or $-CH_2Cl$.

2. A process according to claim 1, in which the amount of compound of formula I applied to the substrate is 0.5 to 40% by weight based on the weight of substrate to which it is applied.

3. A process according to claim 1, in which the amount of compound of formula I used is 2 to 30%.

4. A process according to claim 1, in which the amount of compound of formula I used is 2 to 25%.

5. A process according to claim 1, in which $R_1^\oplus$ is $R_{1a}^\oplus$ where $R_{1a}^\oplus$ is an $N^\oplus$ cation derived from Product A', B', C' or D' where Product A' is the water-soluble reaction product of diethylenetriamine, triethylenetetraamine or tetraethylenepentamine with cyanamide or dicyanodiamide;

Product B' is the water-soluble reaction product of Product A' with epichlorohydrin;

Product C' is the water-soluble reaction product of Product A' or B' with formaldehyde; and Product D' is the water-soluble reaction product of Product A', B' or C' with dimethyloldihydroxyethylene urea, optionally in the presence of a catalyst selected from magnesium chloride or zinc chloride.

6. A process according to claim 5, in which $R_1^{\oplus}$ is an $N^{\oplus}$ cation derived from the Product A' where Product A' is defined in claim 5.

7. A process according to claim 1, in which $R_3$ is —OH.

8. A process according to claim 1, in which $R_2$ is $R_2'$ where $R_2'$ is —OH or a significance of $R_{1a}^{\oplus}$ where $R_{1a}^{\oplus}$ is an $N^{\oplus}$ cation derived from Product A', B', C' or D', where Product A' is the water-soluble reaction product of diethylenetriamine, triethylenetetraamine or tetraethylenepentamine with cyanamide or dicyanodiamide;

Product B' is the water-soluble reaction product of Product A' with epichlorohydrin, Product C' is the water-soluble reaction product of Product A' or B' with formaldehyde, Product D' is the water-soluble reaction product of Product A', B' or C' with dimethyloldihydroxyethylene urea, optionally in the presence of a catalyst selected from magnesium chloride or zinc chloride.

9. A flameproofed substrate containing a compound of formula I defined in claim 1.

* * * * *